UNITED STATES PATENT OFFICE.

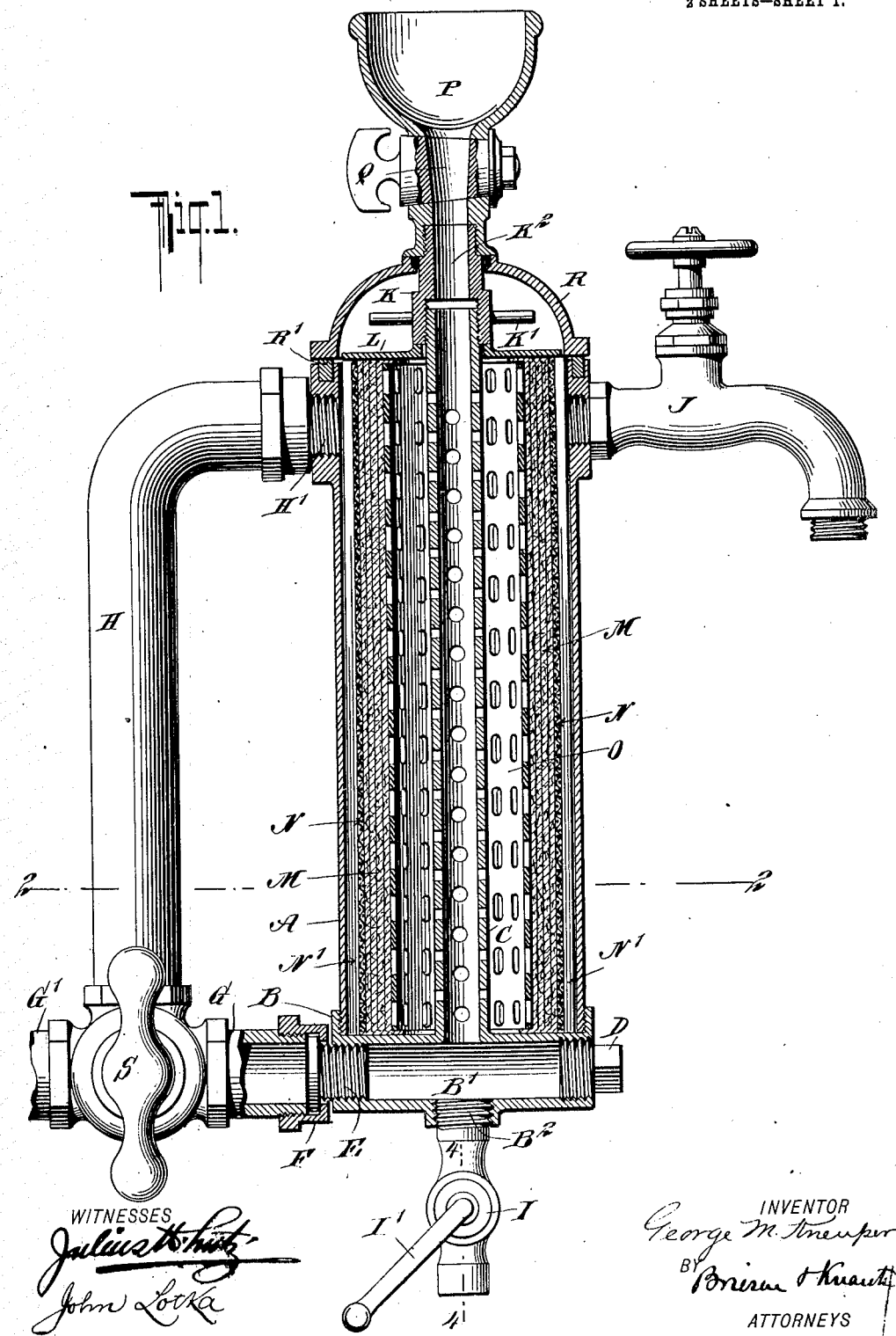

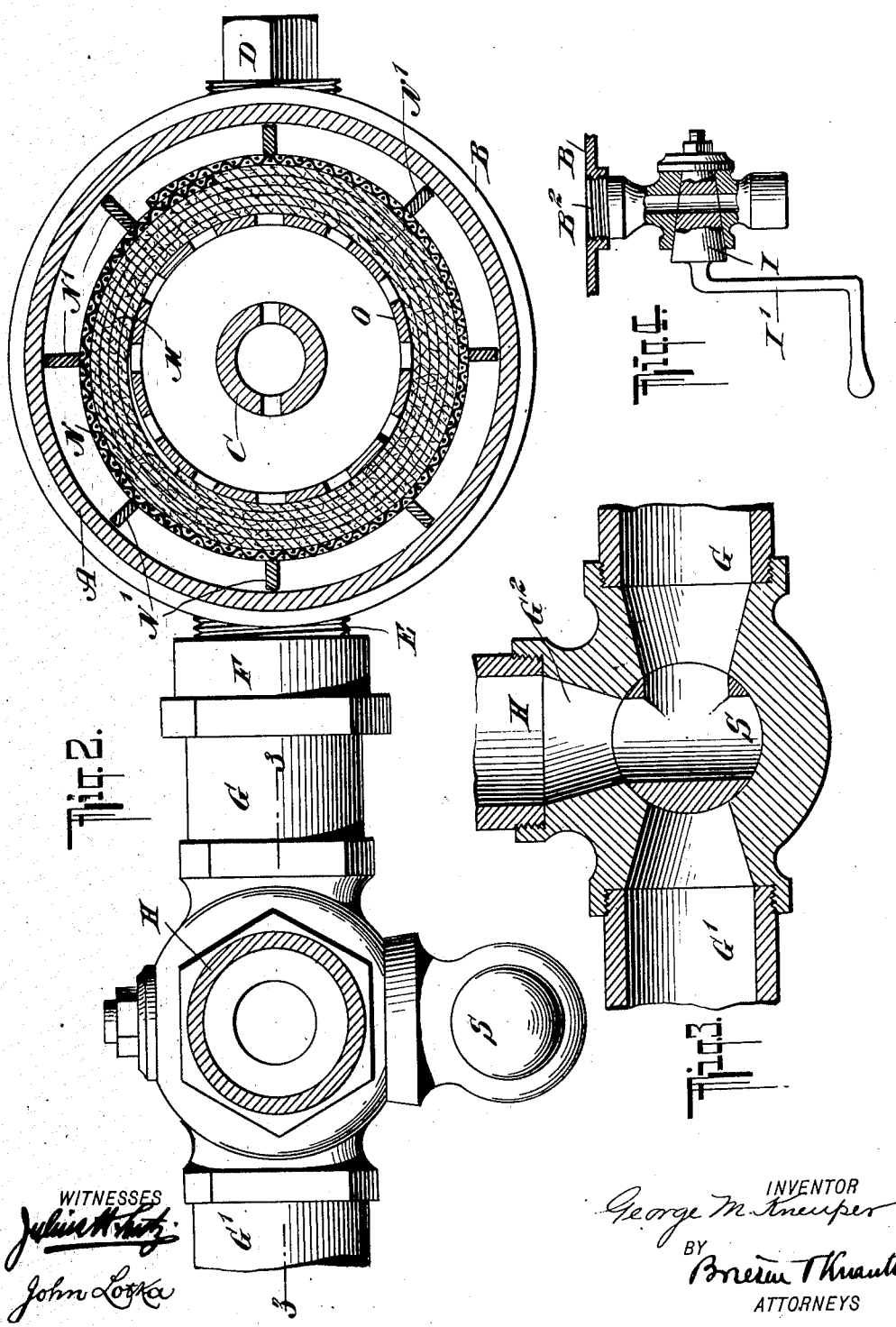

GEORGE M. KNEUPER, OF NEW YORK, N. Y., ASSIGNOR OF ONE-THIRD TO GEORGE KNEUPER AND ONE-THIRD TO KATE KNEUPER.

FILTER.

No. 870,631.   Specification of Letters Patent.   Patented Nov. 12, 1907.

Application filed June 1, 1906. Serial No. 319,674.

*To all whom it may concern:*

Be it known that I, GEORGE M. KNEUPER, a citizen of the United States, and a resident of the borough of Brooklyn, county of Kings, city and State of New York, have invented certain new and useful Improvements in Filters, of which the following is a specification.

My invention relates to filters, and has for its object to combine with a filter a suitable mechanism for cleaning it by the pulsating, and particularly the intermittent action of a current of liquid passed there-through in the direction opposite to the flow of the liquid during filtration; a further object of my invention is to provide convenient means for introducing into the filter a powdered substance, such as charcoal, or calcium phosphate, and depositing said substance on the filtering material or filtering body so as to increase the efficiency thereof.

The invention will be fully described hereinafter and the features of novelty pointed out in the appended claims.

Reference is to be had to the accompanying drawings in which

Figure 1 is a vertical section through a filter fitted with means for cleaning it according to my invention; Fig. 2 is a cross-section on line 2—2 of Fig. 1 drawn upon an enlarged scale; Fig. 3 is a vertical section of line 3—3 of Fig. 2, and Fig. 4 is a side elevation with parts in section on line 4—4 of Fig. 1.

A is a cylindrical shell screwed at the bottom into a bottom member B from which rises at the center the perforated pipe C which communicates with the passage B' of the bottom member. The said passage is closed at one end by a screw plug D which can be removed when it is desired to clean said passage, and at the other end is located an axially perforated screw E connected by means of a clamping nut F with one end of a valve casing G. At G' this valve casing is connected with a supply pipe such as the water-main, and at $G^2$ with a pipe H leading to the inlet H' at the upper end of the shell A. At the lower end of the apparatus is located an outlet $B^2$ controlled by a valve I which may be rotated by means of a crank I'. The upper end of the casing is also provided with a suitable outlet such as a common faucet J.

The upper end of the pipe C is screw-threaded and receives a nut K which is adapted to press down a top plate L arranged to clamp from above the filtering material M and a layer of wire netting N which is wrapped around said filtering material. The filtering material may be a sheet of pulp or cotton or any suitable substance. When a sheet is used it is wrapped on a perforated tube O, the ends of the sheet being bent inward over the edges of said tube so that a tight joint will be formed. The nut K is provided with a handle K' to facilitate its manipulation, and is also provided with a longitudinal channel $K^2$ which communicates with the outlet of a receptacle or cup P screwed upon the upper end of the nut, and having a cock Q controlling the communication of said cup with the channel $K^2$. The lower end of the cup also serves as a clamp to press down a cap R pressing down on a washer R' located at the upper edge of the shell A. In order to space the layer N of wire netting, or other perforated material from the inner wall of the filter casing, longitudinal ribs N' are provided on the outside of said layer in engagement with the inner wall of the shell A.

The connection of the supply pipe G' with either the pipe H or the passage B' in the bottom of the filter is controlled by a three-way cock S which in one position, as shown in Fig. 3, disconnects the supply pipe from the filter, while in its second position it will connect said supply pipe with the pipe H, and in its third position it will connect said supply pipe with the bottom passage B'.

In the normal operation of the filter, the cock Q will be closed, as will also the valve I. The three-way cock S will be turned to connect the supply pipe G' with the bottom passage B'. The water or other liquid to be filtered will travel upward into the pipe C, and travel through the perforations thereof and then through the pipe O to the filtering material M, after passing through which the filtered liquid will issue through the outlet J when the same is opened.

It will be obvious that the deposits due to filtration will form chiefly on the inner surface of the filtering material M. Now in order to dislodge these deposits I send a pulsating current through the filter, that is, a current varying in strength, and in the particular embodiment of my invention shown herein the force of the current varies from a maximum to naught, although this is not absolutely necessary. To accomplish this result the faucet J will be closed and the three-way cock S so turned as to connect the supply pipe G' with the pipe H. Water will then flow through the filter in the opposite direction, and of course pure water should be used for this cleaning operation. If now the outlet cock I should be opened, the sediments would be partly washed out through the opening, but very soon the liquid will become clear showing that the water passes through the filter without any cleaning action. If then, however, the crank I' is revolved so as to alternately open and close the outlet, and thus produce a pulsating and specifically an intermittent current, it will be observed that the stream of water which hitherto was quite clear becomes turbid again, thus clearly showing that the pulsating action of the current has much greater efficiency to clean the filter than the mere reversed flow of the liquid.

While it is obvious that the pulsating action might be obtained by different means and at different points of the path of the current, I consider it preferable and more efficient to produce the pulsation by periodically obstructing the outlet, either partly or entirely, as in this case the back pressure created by the closing or obstructing of the outlet has a beneficial action by producing what is known as a hammer-blow, that is, a shock which tends to loosen the particles of sediment.

The cup P is used for introducing into the center space of the filter a powdered substance or other matter which assists filtration, before the liquid to be filtered is introduced. That is, after filling the cup with the said substance while the cock Q is closed, the said cock would be opened allowing the substance to pass into the central space of the filter, and then the cock Q would be closed and the cock S opened to admit the fluid to be filtered to the central space of the filter. This fluid would naturally force the powdered substance, or other filtering medium, against the inner surface of the filtering material M and deposit it thereon thus increasing the efficiency of said material. The substance so introduced may be, for instance, charcoal or calcium phosphate. The hereinbefore-described pulsating current may also be employed for the removing of this additional filtering substance from the filtering material M when it is no longer desired to use this filtering substance.

Various modifications may be made without departing from the nature of my invention as set forth in the appended claims.

The screw plug D may be taken out when it is desired to filter a fluid other than the water from the mains; such fluid would then be admitted through the opening normally closed by the plug D, the cock S remaining closed. Otherwise the operation will be the same as above described.

I claim:

1. A filter comprising a casing, a perforated tubular member therein, a filtering material surrounding said member, and a layer of perforated material wrapped around said filtering material and held by the inner wall of the casing.

2. A filter comprising a casing, a tubular filtering material therein, and a layer of perforated material wrapped around said filtering material and held by the inner wall of the casing.

3. A filter comprising a casing, a tubular filtering material therein, and a layer of perforated material wrapped around said filtering material and provided with external spacing projections in engagement with the inner wall of the casing.

4. A filter comprising a casing, a tubular filtering material therein, and a layer of perforated material wrapped around said filtering material and provided with longitudinal spacing ribs in engagement with the inner wall of the casing.

5. A filter comprising a casing, a tubular filtering material therein, a layer of perforated material wrapped around said filtering material and projections for spacing said perforated material from the inner wall of the casing.

6. A filter comprising a casing, a perforated pipe rising from the bottom of the casing and screw-threaded at its upper end, a tubular filtering material surrounding said pipe, a top plate fitted around the pipe and arranged to engage the end of the filtering tube, a channeled clamping nut screwing on said pipe and engaging said top plate, and a receptacle supported by said nut and having a valved connection with the channel thereof.

In testimony whereof, I have hereunto signed my name in the presence of two subscribing witnesses.

GEORGE M. KNEUPER.

Witnesses:
  JOHN LOTKA,
  JOHN A. KEHLENBECK.